July 19, 1960
W. D. PRATT
2,945,323
BULB BASKET AND MARKER
Filed March 20, 1959
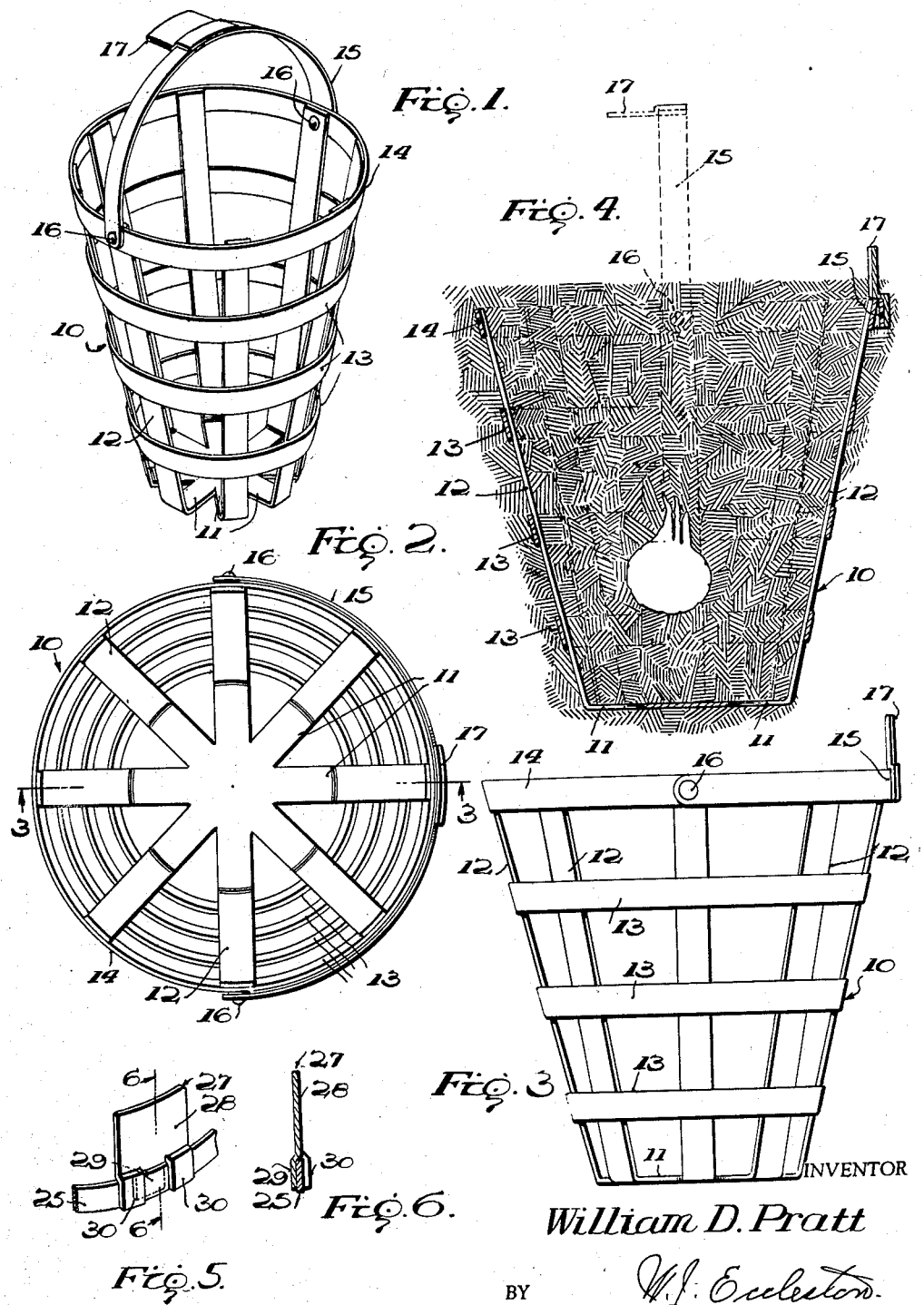
INVENTOR
William D. Pratt
BY
ATTORNEY

2,945,323

BULB BASKET AND MARKER

William D. Pratt, Atlanta General Depot, Forest Park, Ga.

Filed Mar. 20, 1959, Ser. No. 800,899

3 Claims. (Cl. 47—37)

(Granted under Title 35, U.S. Code (1952), sec. 266)

The invention described herein, if patented, may be manufactured and used by or for the Government for governmental purposes, without the payment to me of any royalty thereon.

The invention relates to small baskets adapted to be filled with earth and to be buried thereafter in the ground with a bulb planted in each basket. Many types of bulbs should be dug up every year after the blooming and growth periods but it is frequently difficult to locate all of such bulbs particularly bulbs such as crocuses which are usually planted in the open lawn rather than in a bed. This difficulty is overcome by these baskets, provided the basket itself can be located. If these baskets are completely buried, as they usually are, it is not only difficult to locate them but it is difficult to determine their margins or peripheries. Thus, they are frequently damaged by the digging implement during the digging up process.

With the foregoing in view, it is an object of the invention to provide an improved bulb basket of the class described and particularly an improved means for locating the basket and lifting the same when it is desired to remove the bulb from the ground.

A further object is to provide such a basket which includes a bail handle pivoted thereto and which handle includes a marker adapted to extend above the ground after the basket and bulb are buried.

Other objects and advantages reside in the particular structure of the invention, the structure of the several elements of the same, combinations and subcombinations of such elements with each other and/or a bulb contained therein, all of which will readily be apparent to those skilled in the art upon reference to the attached drawing which illustrates two species of the invention and also to the following specification wherein the invention is described and claimed.

In the drawing:

Figure 1 is a perspective view of one species of the invention;

Figure 2 is an enlarged plan view thereof;

Figure 3 is an elevational view of the same;

Figure 4 is a diametral, vertical sectional view of the same, showing it buried in the ground;

Figure 5 is a fragmentary front view on a reduced scale of a modified form of the invention; and Figure 6 is a vertical sectional view taken substantially on the plane of the line 6—6 of Figure 5.

Referring specifically to the drawing wherein like reference characters designate like parts in all views, and referring at first to the species of invention disclosed in Figures 1 to 4, 10 designates generally any suitable bulb basket which may comprise an open-work bottom formed by horizontal portions 11 of substantially vertical side members 12 which are bound together by vertically spaced horizontal hoops 13 and a top rim 14 whereby to provide an open-work bottom and side wall. A handle bail 15 is pivotally connected to the rim 14 by any suitable pivot means 16 for movement from an inoperative position wherein it is disposed substantially horizontally in flush, concentric relation with the rim 14 to an upright operative position which is substantially vertical.

A marker 17 is fixed to the bail 15 in any suitable manner, not shown, as by being cemented thereto, riveted thereto or formed integral therewith or otherwise. For ease in aligning a plurality of bulbs, it is well to dispose the marker 17 centrally of the bail 15 where it aligns with one of the bottom forming elements 11. However, purely for the purpose of providing a marker, element 17 may be located at any point along the bail 15. The marker 17 may assume a variety of forms but should be long enough to be extended above the surface of the ground when the bulb-containing basket is buried thereabeneath with the bail 15 in the inoperative position. Preferably, the marker 17 comprises a semi-rigid tab which is so connected to the bail 15 that it extends vertically or axially of the basket 10 when the bail is in the inoperative position. This arrangement, as best seen in full lines in Figure 4, permits the entire assembly to be buried so that only the upper end of the tab 17 is exposed. Normally, the exposed portion of the tab 17 will be below the "cut" of a lawn mower so as not to be damaged thereby. Also, when formed of semirigid plastic, such as polyethylene, it may be trod upon without damage. Also, when formed of plastic, it is easy to include bulb identifying means on the tab 17. For instance, the tabs may be provided in a variety of colors with one color identifying one type of bulbs and other colors other types. After the baskets and bulbs have been dug up, the baskets having tabs of one color may be nested with the bulbs in the uppermost basket. Then, at planting time the color of the tab for each basket of bulbs provides an easy identification of each group of bulbs.

By providing each basket with a bail type of handle, the latter is readily buried with the basket until it is desired to dig up the bulbs. Then, the several handles are raised to the operative positions, illustrated in broken lines in Figure 4, the ground is loosened slightly around the baskets with a trowel and the baskets are lifted out by their bails 15. Thus, the bails 15 not only provide mounts for the markers 17 but also locate the margins of the rim 14 whereby to provide guides for the trowel. This is because one half of the rim 14 is disclosed merely by raising the bail 15 to the operative position. If the bail 15 is thereafter moved to the opposite inoperative position the tab 17 will designate the opposite limit of the rim 14. The bail 15, of course, also performs its usual function as a lifting means for the basket.

Figures 5 and 6 disclose a modification of the invention. In this species, a handle bail 25 is normally unincumbered by a marker but may have markers 27 detachably connected thereto by any suitable means. For instance, the markers 27 each may comprise a tab portion 28 and depending spring fingers 29 and 30 which, in use straddle the bail 25 and provide a spring clip for readily detachably connecting the markers 27 to the bail. Obviously, other arrangements will occur to those skilled in the art. The main advantage of this species of the invention is that the markers 27 may be of various colors for bulb identification purposes and may be applied as needed to the baskets. Thus, there is no danger of having an over-supply of one color basket and an under-supply of another color. The tabs 27 are cheap and can be procured as needed at low cost.

It follows from the foregoing that the bulb baskets and markers according to the invention provide an inexpensive way of both locating, identifying, planting, uprooting and storing of a wide variety of bulbs whereby to achieve the objects of the invention.

Also, while there has been shown and described what is now thought to be the two preferred species of the invention, it should be understood that the same is susceptible of other forms and expressions. Thus, the invention is not considered as being limited to the precise structures shown and described hereinabove but only as hereinafter claimed.

I claim:

1. A bulb basket for containing a bulb planted in the ground with the basket, said basket including a handle bail pivoted thereto for movement from a horizontal inoperative position to a substantially vertical operative position, said basket being adapted to be buried in the ground with said bail in said inoperative position and slightly below the surface of the ground, a bail locating marker carried by said bail and extending upwardly of the same when said bail is in said inoperative position, said marker having an upper end, and said marker having sufficient length so that said upper end thereof projects slightly above the surface of the ground when said basket and bail are buried as aforesaid.

2. A bulb basket for containing a bulb planted in the ground with the basket, said basket including a handle bail pivoted thereto for movement from a horizontal inoperative position to a substantially vertical operative position, said basket being adapted to be buried in the ground with said bail in said inoperative position and slightly below the surface of the ground, a bail locating marker, said marker comprising a semi-rigid tab carried by said bail and extending upwardly of the same when said bail is in said inoperative position, said marker having an upper end, and said marker having sufficient length so that said upper end thereof projects slightly above the surface of the ground when said basket and bail are buried as aforesaid.

3. A bulb basket for containing a bulb planted in the ground with the basket, said basket including a handle bail pivoted thereto for movement from a horizontal inoperative position to a substantially vertical operative position, said basket being adapted to be buried in the ground with said bail in said inoperative position and slightly below the surface of the ground, a bail locating marker, said marker comprising a semi-rigid plastic tab fixed to said bail and extending upwardly of the same when said bail is in said inoperatve position, said marker having an upper end, and said marker having sufficient length so that said upper end thereof projects slightly above the surface of the ground when said basket and bail are buried as aforesaid.

References Cited in the file of this patent
UNITED STATES PATENTS

| | | |
|---|---|---|
| 1,678,988 | Maier | July 31, 1928 |
| 1,945,784 | Myer | Feb. 6, 1934 |
| 2,252,073 | Gray | Aug. 12, 1941 |